Oct. 8, 1968   R. S. FRASER ETAL   3,405,212

METHOD OF MAKING METAL CLAD TOOLS

Filed Feb. 17, 1966

INVENTOR.
RICHARD S. FRASER
PAUL Y. JONE
BY
ATTORNEYS

3,405,212
METHOD OF MAKING METAL CLAD TOOLS
Richard S. Fraser and Paul Y. Jone, Seattle, Wash., assignors to Weyerhaeuser Company, Tacoma, Wash., a corporation of Washington
Filed Feb. 17, 1966, Ser. No. 528,279
9 Claims. (Cl. 264—221)

ABSTRACT OF THE DISCLOSURE

A method of making plastic contour tools having a hard, high melting point metal on the surface thereof by direct deposition of such metals comprising impregnating or intermixing with the mold surface a water-soluble thermoplastic material prior to deposition of the high melting point material on the impregnated surface. After deposition of the metal a plastic backing is deposited on the metal coat and the plastic backing hardened by heat. The plastic tool is easily separated from the mold by immersing the mold in water to partially dissolve the water-soluble thermoplastic material. The preferred water-soluble thermoplastic material is a polyamide-epichlorohydrin resin.

---

This invention relates to plaster molds as used in the art of fabricating plastic contour tools. More specifically, this invention relates to plaster molds treated in such a way as to be able to produce plastic tools having a hard, high melting point material on the surface thereof.

In the art of making molds for the molding of plastic tools of various configurations, it is the practice to begin with a pattern or other representation of the tool, then to make a reverse impression of this pattern in the form of a plaster mold, which in turn is used to form the plastic tool by the process of casting and the like.

In the event that it is desired to provide the tool with a harder and tougher and/or more heat resistant surface than may be obtained in the plastic media, it has been the practice to attempt to deposit metal particles on the plaster mold by the wire spray process to a thickness sufficient to form a metallic surface or face for the plastic tool to be molded behind said metallic face.

This procedure has proven to contain severe limitations of effectiveness, because common plaster molds as used in the plastic tooling art are incapable of receiving any but the low melting and softer metals such as aluminum, zinc and tin. It is the practice, therefore, when the higher melting point metals must be used, to lay on a thin coat of a softer metal and follow it with the harder one such as bronze, steel, etc. Then, after the tool has been completed and removed from the mold, the thin coating of softer metal is ground off, exposing the harder metal as the tool surface.

This process is not only time consuming, but places limits upon the accuracy with which a given dimension or configuration may be duplicated.

Another limitation of the present art is that the metal may not be deposited directly upon a plaster mold for the following reasons:

(1) The metal tends in most cases to rebound from the surface, with only a small amount remaining. This results in an uneven deposit which will tend to crack and curl.

(2) If, in spite of the foregoing conditions a complete coverage of the mold is achieved, the metal particles are so embedded in the plaster surface that when the tool has been completed, it is impossible to remove the tool from the plaster without the time-consuming process of removing each individual particle of plaster.

(3) This has been partially overcome in the practice of the art by applying a thin coating of rubber-like adhesives which can be partially dissolved with solvents and these facilitate removal of the tool from the mold. Likewise, a thermoplastic coating such as nylon has been so used. However, the application of such adhesives is critical and does not permit the deposition of any but low melting point, soft metals.

(4) Conventionally used plaster molds are subject to cracking under the heat and stress of the metal spray process.

(5) It has not been possible to this time to deposit ceramic such as alumina or zirconia or cermets such as nickel aluminide upon plaster molds because of the intense heat required for their deposition.

It is the object of this invention to provide a plaster mold with properties which will:

(1) Permit the direct deposition of metals and subsequently provide for their release.

(2) Permit the direct deposition of higher melting point materials and provide for their subsequent release.

Such molds make possible the fabrication of plastic tools with metallic and/or ceramic surfaces which may be easily removed from the molds on which they are made and will conform precisely to the original configuration of the mold.

These and other objects and advantages will become manifestly clear to those skilled in the art when taken in conjunction with the detailed description and drawings, wherein.

Figure 1:
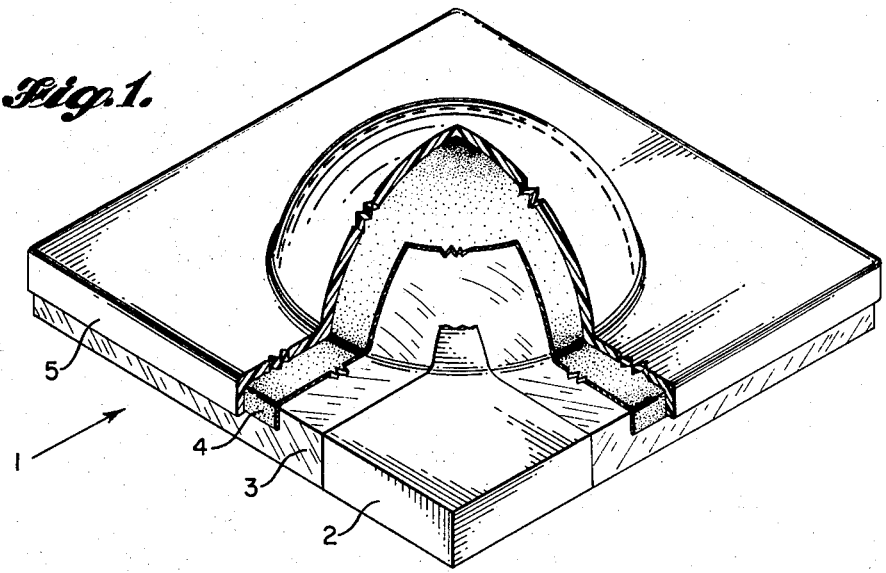
FIGURE 1 is a perspective view of the mold with parts broken away to show internal details.
Figure 2:
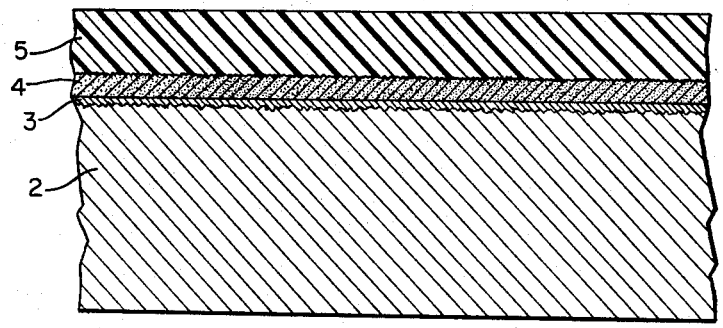
FIGURE 2 is a cross sectional view of the mold to show the relationship between the various components.

In the practice of the present invention, the mold assembly is indicated at 1 and is composed of a mold 2 shown in this instance as being hemispherical in form with outstanding edges or flanges. The mold 2 is composed of a gypsum plaster material.

After the mold 2 has been cast, it is allowed to set until firm and removed from the pattern. Then a water-soluble, thermoplastic resinous material 3 is impregnated into the surface of the mold 2. Then the mold 2 is placed in an oven and heated for 10 min. at a temperature of between 300 and 400° F. The water-soluble, thermoplastic material may be selected from a group consisting of polyamide-epichlorohydrin resin, polyethyleneimine resin, polyethylene oxide resin, polyalkylene glycol resin, or mixtures thereof.

Upon removing the mold 2 from the oven it is immediately coated with a hard, high melting point material 4. The hard, high melting point material 4 may be applied by the metal spray technique using bronze, steel, aluminum, copper, nickel, chromium or zinc. Also, the material 4 may be a ceramic material composed of a mixture of powders of aluminum oxide and nickel aluminide or zirconium oxide and may be applied through an oxyacetylene flame. In the event that the ceramic coating is applied to the resin film 3, it is desirable to back this material with a wire spray coating of aluminum or other metals which increases the stability of the coating 4. The thickness of the material 4 will depend upon the particular end use of the molded product.

After the coating of the hard, high melting point material 4 has been applied, the mold is cooled and a plastic backing material 5 is bonded to the coating 4. The thickness of the plastic material 5 may be any thickness which gives the final product the properties required in its use. The mold is now placed in the oven for a predetermined period of time if required to fully cure the plastic backing 5. The plastic backing 5 may be any suitable plastic tooling material.

After the plastic backing 5 has been fully cured, the assembly is removed from the oven and cooled. Then the over-all mold and tool are immersed in water until the water-soluble resin 3 has been partially dissolved. The mold 2 is removed from the tool to leave a smooth surface on the hard, high melting point material 4. Since the material 3 impregnating the mold 2 and material 4 is water soluble, the tool that is formed with the present invention will be readily released from the mold 2, yet it will readily conform to the exact dimensions of the mold 2. Accordingly, the accuracy of the tools formed according to the process of the present invention is greatly increased.

Alternately, the mold 2 of the present invention may be formed by intermixing the gypsum plaster and the water-soluble thermoplastic resinous material. In this instance, the mold 2 will require that the gypsum plaster intermixed with the thermoplastic materials be baked until the same is fully cured prior to applying the hard, high melting point material 4 thereon. Of course, the step as outlined above of applying the material 3 will be omitted.

In order to illustrate the merits of this invention, reference is made to the following examples:

Example I

A plaster mold was formed from gypsum and silica-containing plasters and was air dried at ambient temperature for 3 hrs. and then impregnated on all surfaces with a water-soluble polyamide-epichlorohydrin resin. A suitable resin is described in the patent to Babcock, U.S. Patent No. 3,224,990. After air drying for 15 min., the impregnated mold was placed in an oven at 400° F. for 10 min., removed and immediately sprayed with bronze using the flame spray technique. After 10 to 15 mils of bronze had been deposited, the mold was returned to the oven. When the mold reached 235° F. internal temperature, it was removed from the oven and immediately sprayed continuously with bronze until a thickness of approximately 1/16" had been built up. It was allowed to cool and a plastic tooling material was bonded to the metal shell and the whole returned to the oven at 350° F. to fully cure the plastic. After curing, the mold was removed from the oven, cooled, and immersed in water for 1 hr. Parting was then effected between the metal face and the mold and the metal faced tool was ready for use.

Example II

The process as set forth in Example I was repeated three times but using stainless steel, aluminum, and copper instead of bronze as the hard, metal surface material.

Example III

A plaster mold made of heat resistant plaster was formed into a pattern and impregnated with a polyamide-epichlorohydrin resin to saturation of the surface. It was placed in a 400° F. oven for 10 min., removed and immediately sprayed with a semiceramic material composed of a mixture of aluminum oxide and nickel aluminide that was passed through an oxy-acetylene flame. The material was deposited to a thickness of approximately 0.005" and then was sprayed with bronze wire using the wire spray process. This shell was then backed with a plastic material and baked until the plastic backing was cured. The assembly was removed from the oven. Then the tool was removed from the mold. The product was a ceramic-coated tool that was ready for use.

Example IV

A mixture of gypsum plaster and a white plaster-containing refractory material was made. To 1500 grams of the mixed plaster was added 660 grams of water which produced, after vigorous hand mixing, a stiff mortar. After letting this mortar stand for 5 min., 400 grams of a water-soluble polyamide-epichlorohydrin resin was added and completely mixed. A casting was made upon a 9" diameter pattern coated with stearic acid dispersed in kerosene. After the casting had set well, it was removed from the pattern and placed in a 250° F. oven until it turned a uniform, light brown color. It was removed from the oven and sprayed with bronze until a thickness of approximately 1/10" was built up. A thermo-setting plastic was cast against this metal shell and cured at 350° F. After curing, the plaster was cracked with a chisel at its periphery and the whole placed in hot water for one hour. Removal of the metal faced plastic object was then effected and the metal polished.

Example V

The process as set forth in Example IV was repeated five times but using stainless steel, aluminum, copper, aluminum oxide and zirconium oxide as the hard, surface material.

While specific details of a preferred embodiment have been set forth above, it will be apparent that many changes and modifications may be made therein without departing from the spirit of the invention. It will, therefore, be understood that what has been described herein is intended to be illustrative only and is not intended to limit the scope of the invention.

What is claimed is:

1. A method of manufacturing a plastic tool having a hard, high melting point metal on the surface thereof comprising:
   (a) impregnating the surface of a mold with a water-soluble thermoplastic material,
   (b) depositing a hard, high melting point material on said impregnated surface,
   (c) depositing a plastic backing on said hard, high melting point material,
   (d) hardening said plastic material, and
   (e) separating said mold from high melting point material by immersion of the mold in water to partially dissolve said water-soluble thermoplastic material.

2. The method according to claim 1 wherein said water-soluble thermoplastic material is a polyamide-epichlorohydrin resin.

3. The method according to claim 1 wherein said water-soluble thermoplastic material is a polyethyleneimine resin.

4. The method according to claim 1 wherein said water-soluble thermoplastic material is a polyethylene oxide resin.

5. The method according to claim 1 wherein said water-soluble thermoplastic material is a polyalkylene glycol resin.

6. The method according to claim 1 wherein said hard, high melting point material is a metal selected from the group consisting of bronze, steel, copper, nickel, and mixtures thereof.

7. The method according to claim 1 wherein said hard, high melting point material is a cermet.

8. The method according to claim 1 wherein said hard, high melting point material is a ceramic material.

9. The method according to claim 1 wherein said water-soluble thermoplastic material is intermixed with said mold material prior to forming of said mold.

References Cited

UNITED STATES PATENTS

| 3,064,314 | 11/1962 | Gagne et al. | 264—219 |
| 3,079,640 | 3/1963 | Kawai | 264—130 |

FOREIGN PATENTS 347,046   4/1931   Great Britain.

OTHER REFERENCES

Metallizing Engineering Co., The Metco Flame Spraying Processes, 1960.

JAMES A. SEIDLECK, *Primary Examiner.*

J. R. THURLOW, *Assistant Examiner.*